US009796903B2

(12) United States Patent
Agapiou et al.

(10) Patent No.: US 9,796,903 B2
(45) Date of Patent: Oct. 24, 2017

(54) IN SITU REFRACTORY BINDER COMPOSITIONS

(71) Applicant: Halliburton Energy Services, Inc., Houston, TX (US)

(72) Inventors: Kyris Agapiou, Houston, TX (US); Ben Iverson, Akron, OH (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/038,354

(22) PCT Filed: Dec. 20, 2013

(86) PCT No.: PCT/US2013/076809
§ 371 (c)(1),
(2) Date: May 20, 2016

(87) PCT Pub. No.: WO2015/094322
PCT Pub. Date: Jun. 25, 2015

(65) Prior Publication Data
US 2016/0289531 A1 Oct. 6, 2016

(51) Int. Cl.
*E21B 33/14* (2006.01)
*C04B 28/18* (2006.01)
(Continued)

(52) U.S. Cl.
CPC .................. *C09K 8/44* (2013.01); *C04B 7/32* (2013.01); *C04B 28/18* (2013.01); *C04B 28/34* (2013.01);
(Continued)

(58) Field of Classification Search
CPC .. C09K 8/487; C09K 8/44; C09K 8/46; E21B 33/14
See application file for complete search history.

(56) References Cited

U.S. PATENT DOCUMENTS 3,557,876 A 1/1971 Tragesser
3,876,005 A 4/1975 Fincher et al.
(Continued)

OTHER PUBLICATIONS

International Search Report and Written Opinion issued in related PCT Application No. PCT/US2013/076809 dated Sep. 26, 2014, 12 pages.
(Continued)

*Primary Examiner* — Zakiya W Bates
(74) *Attorney, Agent, or Firm* — Craig W. Roddy; Baker Botts L.L.P.

(57) ABSTRACT

Corrosion-resistant refractory binder compositions may be formed with a calcium ion source, high-alumina refractory aluminosilicate pozzolan, and water. Any one or more of such components may individually be non-cementitious. Examples of high-alumina refractory aluminosilicate pozzolan include crushed firebrick; firebrick grog; and mixtures of silicate and any one or more of corundum, high-alumina ceramic, and bauxite; refractory mortar; fire clay; mullite; fused mullite; and combinations thereof, among others. A binder composition may be mixed with sufficient amount of water to form a slurry, which slurry may be introduced into a subterranean formation (e.g., via a wellbore penetrating the subterranean formation). A plurality of the non-cementitious components may react in the presence of water when exposed to suitable conditions so as to enable the binder composition to set. Such compositions, once set, may exhibit enhanced corrosion and/or heat resistance as compared to other binder compositions.

20 Claims, 3 Drawing Sheets

(51) Int. Cl.
*C09K 8/44* (2006.01)
*C04B 28/34* (2006.01)
*C09K 8/46* (2006.01)
*C09K 8/473* (2006.01)
*C09K 8/487* (2006.01)
*C04B 7/32* (2006.01)

(52) U.S. Cl.
CPC ............... *C09K 8/46* (2013.01); *C09K 8/473* (2013.01); *C09K 8/487* (2013.01); *E21B 33/14* (2013.01); *Y02W 30/96* (2015.05)

(56) References Cited

U.S. PATENT DOCUMENTS

| | | | |
|---|---|---|---|
| 5,346,012 | A | 9/1994 | Heathman et al. |
| 2004/0211562 | A1 | 10/2004 | Brothers et al. |
| 2009/0038801 | A1 | 2/2009 | Ravi et al. |
| 2011/0031132 | A1* | 2/2011 | Schwarz ............... C04B 28/006 205/735 |
| 2013/0284070 | A1* | 10/2013 | Dubey ................... C04B 11/28 106/695 |
| 2014/0264140 | A1* | 9/2014 | Gong ..................... C04B 38/02 252/62 |

OTHER PUBLICATIONS

International Preliminary Report on Patentability issued in related Application No. PCT/US2013/076809, dated Jun. 30, 2016 (9 pages).

\* cited by examiner

IN SITU REFRACTORY BINDER COMPOSITIONS

CROSS-REFERENCE TO RELATED APPLICATION

The present application is a U.S. National Stage Application of International Application No. PCT/US2013/076809 filed Dec. 20, 2013, which is incorporated herein by reference in its entirety for all purposes.

BACKGROUND

The present disclosure relates generally to cementing and other subterranean operations using binder compositions and, more particularly, to binder compositions demonstrating improved corrosion and heat resistance, and to associated methods of using forming such compositions.

Binder compositions may be used in a variety of subterranean applications. An example of a subterranean application that utilizes binder compositions is primary cementing whereby pipe strings, such as casing and liners, are cemented in well bores penetrating subterranean formations. In performing primary cementing, a binder composition may be pumped into an annular space between the walls of a well bore and the exterior surface of the pipe string disposed therein. The binder composition sets in the annular space, thereby forming therein an annular sheath of hardened cement (i.e., a cement sheath) that supports and positions the pipe string in the well bore and bonds the exterior surface of the pipe string to the walls of the well bore. Binder compositions also may be used in remedial cementing operations, for example, to seal cracks or holes in pipe strings, to seal highly permeable zones or fractures in subterranean formations, and the like. Binder compositions also may be used in surface applications, for example, construction cementing.

Binder compositions such as those employed in well bores may encounter a range of temperature and pressure conditions, and may additionally be exposed to a variety of corrosive agents such as carbon dioxide, flowing acid, and the like. For example, carbonic acid ($H_2CO_3$) may be produced by reaction of subterranean water and carbon dioxide ($CO_2$), which may be naturally present and/or injected (e.g., in a $CO_2$-enhanced recovery operation) into the well. Carbonic acid is believed to react with calcium hydroxide that may be present in some cements (e.g., Portland cement), which reaction may corrode the cement, thereby potentially causing deterioration of the set cement. This could increase the permeability of the set cement, which could in turn allow permeation of compounds from a subterranean formation (e.g., chloride and hydrogen sulfide ions) through the cement and to the casing, which in turn may corrode the casing and cause undesirable interzonal communication of fluids. Corrosion problems may be especially pronounced in high temperature environments, such as high temperature wells (e.g., geothermal wells), which typically involve high temperature, high pressure, and high concentration of carbon dioxide. In such wells, cement failures may occur in less than five years, causing the collapse of the well casing. This, in turn, may cause lost production and may necessitate expensive casing repairs.

Figure 1:
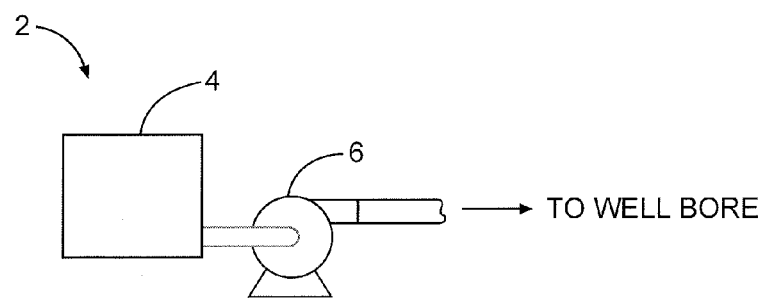
FIG. 1 illustrates a system for preparation and delivery of a binder composition to a well bore in accordance with aspects of the present disclosure.

While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and are not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells, monitoring wells, and production wells, including hydrocarbon or geothermal wells.

The present disclosure relates generally to cementing and other binder composition operations and, more particularly, to binder compositions demonstrating improved corrosion and heat resistance, and to associated methods of forming and of use.

Binder compositions according to some embodiments of the present disclosure may comprise: a calcium ion source; a high-alumina refractory aluminosilicate pozzolan; and water. A binder composition according to some embodiments may further comprise an accelerant. In certain embodiments, any one or more suitable additives may also be included in the composition.

Among the many potential benefits and advantages of the present disclosure, the binder compositions of some embodiments may be prepared without clinker or other individual constituents that, on their own, are cementitious. In other words, such binder compositions may be prepared with non-cementitious constituent compounds. As used herein, a compound is "non-cementitious" when, on its own, it does not possess the ability to set like cement. As used herein, "set," "settable," or "setting" refers to the process of a material such as a binder composition according to some embodiments hardening from a slurry state to a solidified state, and/or the ability for a binder composition to experience such hardening. For example, "setting" may refer to a material hardening due at least in part to hydration reactions in the presence of water. In some embodiments, setting may be particular to placement of material such as a binder composition in suitable conditions (e.g., suitable temperature and/or pressure). Such placement may be downhole, in accordance with some embodiments.

Nonetheless, reaction of non-cementitious constituent compounds included in some binder compositions, in the presence of water, in some embodiments leads to the formation of a cementitious (e.g., settable or set) material. This may enable some cement-free compositions of certain embodiments to form a set binder composition in situ once exposed to conditions suitable for setting (e.g., by being delivered to a desired location such as a point within a borehole penetrating a subterranean formation). For example, a plurality of constituents of the binder composition (such as the calcium-ion source and high-alumina refractory aluminosilicate pozzolan in some embodiments) may be non-cementitious, yet react in the presence of the water to form cementitious, settable, and/or set material, for instance via one or more pozzolanic reactions and/or side reactions that may occur along the course of the pozzolanic reaction. Side reactions in accordance with some embodiments may include reaction between calcium hydroxide $(Ca(OH)_2)$ and aluminate $(Al(OH)_4^-)$ found in the pozzolan, thereby forming one or more calcium aluminate hydrates such as, in cement chemist notation, $C_4AH_{13}$ and $C_3AH_6$ (i.e., hydrogarnet), among others. Some calcium aluminate hydrates in combination with silicates may be formed (such as $C_2ASH_8$, i.e., strätlingite).

Furthermore, either of the calcium-ion source and the high-alumina refractory aluminosilicate pozzolan according to some embodiments may be sourced from inexpensive and commonly available materials, providing cost-saving benefits. In some embodiments, either of the calcium-ion source and the high-alumina refractory aluminosilicate pozzolan may be recycled and/or waste products, thereby providing environmental benefit through their repurposing. In addition, the capability of compositions according to some embodiments to form cementitious material in situ may advantageously avoid the need to use clinker and clinker-derived materials for cementing or other binding operations, which could further reduce the environmental impact associated with the binder compositions of such embodiments.

As previously noted, the binder compositions of some embodiments may include water. The water may be from any source provided that it does not contain an excess of compounds that adversely affect other compounds in the binder composition. For example, a binder composition of the present disclosure may comprise fresh water, salt water (e.g., water containing one or more salts dissolved therein), brine, seawater, or any combination thereof. The presence of water may in some embodiments enable reaction between and/or among a plurality of the constituents of the binder composition, thereby forming cementitious compounds. For example, water may enable a calcium ion source and high-alumina refractory aluminosilicate pozzolan to react so as to form cementitious compounds. Water may therefore be present in the binder compositions of some embodiments in an amount sufficient to enable such a reaction between a calcium ion source and high-alumina refractory aluminosilicate pozzolan. In some embodiments, water may furthermore be present in the binder composition an amount sufficient to form a pumpable slurry of the binder composition. More particularly, the water may be present in the binder compositions of some embodiments in the range of from about 25% to about 200% by weight of the pozzolan (sometimes referred to herein as "bwop"). As used herein, "by weight of pozzolan" and "bwop" each mean weight relative to the weight of high-alumina refractory aluminosilicate pozzolan in the binder composition. In some embodiments, the water may be present in the binder composition in an amount as little as any one of about: 25, 26, 27, 28, 29, 30, 31, 32, 33, 34, 35, 36, 37, 38, 39, 40, 41, 42, 43, 44, 45, 46, 47, 48, 49, 50, and so on in increasing integral amounts up to 170% bwop. In some embodiments, the water may be present in an amount as little as any non-integer % bwop between any two of the immediately aforementioned percentages. The water may be present in some embodiments in an amount as great as any one of about 40, 41, 42, 43, 44, 45, 46, 47, 48, 49, 50, and so on in increasing integral amounts up to 200% bwop. In some embodiments, the water may be present in an amount as great as any non-integer % bwop between any two of the immediately aforementioned percentages. Thus, the water may be present in an amount ranging from about 25 to about 50% bwop; or from about 30.1 to about 55.5% bwop; or from about 35% to about 45% bwop; or from about 30% to about 100% bwop, etc.

The binder compositions of some embodiments, when formed into a slurry, generally may have a density ranging from about 5 lb/gal to about 25 lb/gal. In some embodiments, a lower end of density of the binder composition slurry may be any one of about 5, 6, 7, 8, 9, 10, 11, 12, 13, 14, 15, 16, 17, 18, 19, and 20 lb/gal, and non-integer intervals in between any two of the preceding numbers. An upper end of density of the binder composition slurries of some embodiments may be any one of about 7, 8, 9, 10, 11, 12, 13, 14, 15, 16, 17, 18, 19, 20, 21, 22, 23, 24, and 25 lb/gal, and non-integer intervals in between any two of the preceding numbers. Thus, for example, binder composition density according to some embodiments may be from about 8 lb/gal to about 17 lb/gal. In other embodiments, it may be from about 6 lb/gal to about 22 lb/gal, etc. In some embodiments, binder compositions may be or may include low-density binder compositions, such as foamed binder compositions or binder compositions comprising microspheres. Additives related to foaming binder composition slurries are discussed in greater detail hereinbelow.

As noted, the binder compositions of some embodiments may include a calcium ion source. Suitable calcium ion sources of various embodiments include any compound such as a calcium-containing salt or other species that is capable of dissociation to give calcium ions. In some embodiments, the calcium ion source may be capable of reacting with any other constituent of the binder composition so as to form cementitious material. For example, suitable calcium ion sources according to some embodiments may be capable of reacting with high-alumina aluminosilicate in the presence of water so as to form cementitious material. Examples of calcium ion sources include: hydrated lime (which may alternatively be referred to as, e.g., calcium hydroxide $(Ca(OH)_2)$, slaked lime, builders' lime, and/or slack lime); quick lime (CaO, unhydrated); and calcium salts in the presence of a hydroxide ion source. Calcium salts according to some embodiments may be of the form $CaX_2$, where X is an anion with a formal charge of −1 (e.g., $CaBr_2$, $CaF_2$, $CaI_2$, $CaCl_2$). Calcium salts according to other embodiments may be of the form CaX, where X is an anion with formal charge of −2 (e.g., carbonate anion $CO_3^{-2}$). In some embodiments, a calcium ion source may be accompanied by or otherwise combined with a hydroxide ion source in a binder composition. Such a source may include a hydroxide salt of an alkali or alkaline earth element. Suitable hydroxide salts include sodium hydroxide, potassium hydroxide, and calcium hydroxide. In certain embodiments, the calcium ion source may be included in a binder composition and subjected to alkaline conditions (for example, in order to support a pozzolanic reaction between the calcium ion source and pozzolan of some binder compositions, by, e.g., facilitating dissociation of the aluminosilicate pozzolan).

In some embodiments, the calcium ion source itself may be alkaline or may, upon disassociation, create alkaline conditions (e.g., as in the case of hydrated lime or $Ca(OH)_2$).

A calcium ion source according to some embodiments may be substantially solid (e.g., hydrated lime). Solid calcium ion sources may include powders, grogs, crushed materials, and the like. A calcium ion source according to other embodiments may be dissolved or suspended in solution (e.g., it may be provided in aqueous solution). In such instances, amounts of calcium ion sources included in the binder composition are in terms of the mass of calcium ion source within the solution (not total mass of the solution). In certain embodiments, the calcium ion source may be present in the binder compositions in the range of from about 5% to about 100% bwop. The low end of the range of calcium ion source present in some embodiments may be any one of about 5, 10, 15, 20, 25, 30, 35, 40, 45, 50, 55, 60, 65, 70, 75, 80, 85, 90, and 95% bwop, and/or any integer or non-integer value between any two of the preceding numbers, which values are not listed out for the sake of brevity. The high end of the range of calcium ion source may be any one of about 10, 15, 20, 25, 30, 35, 40, 45, 50, 55, 60, 65, 70, 75, 80, 85, 90, 95, and 100% bwop, and/or any integer or non-integer value between any two of the preceding numbers, which values are not listed out for the sake of brevity. Thus, suitable exemplar ranges according to the foregoing may include, e.g., about 5.1%-about 48.5% bwop; about 20.15%-35.20% bwop; about 6.00%-70.00% bwop; about 10%-about 30% bwop, etc. In yet other embodiments, there may be no upper limit to the amount of calcium ion source included in the binder composition.

The binder composition may further include a high-alumina refractory aluminosilicate pozzolan. As used herein, the term "high-alumina refractory aluminosilicate pozzolan" means a pozzolan having a ratio of Alumina:silica (or A:S, in cement chemists' notation) greater than about 0.7. The ratio of alumina:silica in some embodiments may be greater than 1, and in certain embodiments can be as high as at least 17. In other words, the high-alumina refractory aluminosilicate pozzolan may comprise more alumina than silica, and in some cases substantially more alumina than silica. In some embodiments, the high-alumina refractory aluminosilicate pozzolan may be non-cementitoius. Examples of non-cementitious high-alumina refractory aluminosilicate pozzolan include crushed firebrick; firebrick grog; mixtures of silicate and any one or more of corundum, high-alumina ceramic, and bauxite; refractory mortar; fire clay; mullite; fused mullite; and combinations thereof, among others. The high-alumina refractory aluminosilicate pozzolan may in some embodiments serve as a reactant for creating cementitious and/or set compounds within the binder composition. It may further provide compounds that impart heat and/or corrosion resistance to a binder composition once it is set, according to some embodiments. In some instances, higher alumina content in the binder composition may correspond to greater heat resistant properties, which may be advantageous in high temperature applications (e.g., well bores including temperatures of about 200° F. or higher). Some high-alumina refractory aluminosilicate pozzolans such as crushed firebrick and firebrick grog may include crystalline structures as opposed to the amorphous structures of some other aluminosilicate materials.

Furthermore, some high-alumina refractory aluminosilicate pozzolans, such as crushed firebrick and firebrick grog, may exhibit substantial consistency (that is, lack of significant variation) in their properties among materials obtained from different sources. For example, high-alumina refractory aluminosilicate pozzolan according to some embodiments, such as crushed firebrick and/or firebrick grog, may be derived from manufactured material that has either met or is close to meeting particular specifications, and therefore may avoid the inconsistencies resulting from using naturally occurring and/or waste-stream material that has been subjected to little or no quality control. This could provide several advantages over other cement fillers and cementitious-compound reactants, such as siliceous fillers like fly ash, cement kiln dust, and the like. For instance, different batches of "fly ash" (which refers to the finely divided residue that results from the combustion of ground or powdered coal and that is carried by, e.g., flue gases generated by power plants) may exhibit significantly different properties due to the nature of formation of fly ash, which results in wide variation from batch to batch. In particular, fly ash may be contaminated with any one or more of lime, cement, gypsum, CaO, and $SiO_2$, among others. Therefore, incorporating fly ash into a binder composition could result in the need to perform testing and modification of cement formulations each time a different batch of fly ash is obtained and incorporated into the binder composition due to the aforementioned and other inconsistencies. The use of substantially consistent material, such as firebrick grog, may on the other hand enhance the consistency (and thereby reduce the need for repetitive testing and/or reformulation) of binder compositions, even when different batches and/or different sources of firebrick grog are used. Moreover, this advantage may also allow binder compositions of some embodiments to be suitable not only for high-temperature applications, but also low-temperature applications (e.g., those under about 200° F.) where cement materials including filler such as fly ash may yield unpredictable results.

The inclusion of a high-alumina refractory aluminosilicate pozzolan such as crushed firebrick and/or firebrick grog in some embodiments may result in a binder composition that, once set and/or cured, contains a higher amount of aluminum- and/or alumina-containing species relative to other binder compositions instead employing fillers such as fly ash, pumice, shale, or the like. Similarly, the inclusion of high-alumina refractory aluminosilicate pozzolan may significantly reduce or substantially eliminate the amount of amorphous material present in the set binder composition, and furthermore may lead to a reduced amount of quartz present in the set binder composition, thereby resulting in enhanced properties such as compressive strength, corrosion resistance, heat resistance, and/or set time. High-alumina refractory aluminosilicate pozzolan according to some embodiments may furthermore impart high temperature stability and corrosion resistance to a binder composition. This may in some instances be due to species such as mullite, corrundum, etc. present in high-alumina refractory aluminosilicate pozzolans according to some embodiments. In addition, high-alumina refractory aluminosilicate pozzolan such as crushed firebrick and/or firebrick grog may impart inherent heat and chemical resistance to a binder composition including such materials. Table 1 below shows X-ray diffraction ("XRD") compositional analysis of various components that may be included in binder compositions, including some components present due to the inclusion of high-alumina refractory aluminosilicate pozzolan. Specifically, Table 1 compares the composition in wt % of a high-alumina refractory aluminosilicate pozzolan (in Table 1, firebrick grog "FBG") with each of: cement kiln dust (CKD), fly ash (Fly Ash F), pumice, and shale. Table 2 shows a full oxide analysis of the firebrick grog compared to the other aforementioned binder composition components.

TABLE 1

XRD of Various Binder Composition Components

| | | FBG | CKD | Fly Ash F | Pumice | Shale |
|---|---|---|---|---|---|---|
| Calcite | $CaCO_3$ | — | 53% | — | — | — |
| Quartz | $SiO_2$ | 2% | 19% | 19% | — | 62% |
| Lime | CaO | — | 8% | — | — | — |
| Anhydrite | $CaSO_4$ | — | 5% | — | — | — |
| Arcanite | $K_2SO_4$ | — | 4% | — | — | — |
| Kaolinite | — | — | 4% | — | — | — |
| Dolomite | $CaMg(CO_3)_2$ | — | 3% | — | — | — |
| Muscovite | — | — | 3% | — | — | trace |
| Pyrite | $FeS_2$ | — | 1% | — | — | — |
| Mullite | $Al_6Si_2O_{13}$ | 69% | — | 26% | — | — |
| Corundum | $Al_2O_3$ | 27% | — | — | — | — |
| Cristobalite | $SiO_2$ | 1% | — | — | — | — |
| Augite | (Ca, Na) (Mg, Al, Fe, Ti) (Si, Al)$_2$O$_6$ | — | — | — | — | 5% |
| K-feldspar | $KAlSi_3O_8$ | 1% | — | — | — | 9% |
| Na-feldspar | $NaAlSi_3O_8$ | — | — | — | — | 5% |
| Magnetite | $Fe_3O_4$ | — | — | 8% | — | — |
| Hematite | $Fe_2O_3$ | — | — | 5% | — | — |
| Amorphous | non-crystalline | — | — | 42% | 100% | 13% |

TABLE 2

Full Oxide Analysis of Binder Composition Components

| | FBG | CKD | Fly Ash F | Pumice | Shale |
|---|---|---|---|---|---|
| $Na_2O$ | 0.00% | 0.21% | 0.24% | 0.14% | 0.07% |
| MgO | 0.14% | 0.88% | 0.07% | 0.12% | 0.69% |
| $Al_2O_3$ | 65.91% | 4.28% | 22.72% | 11.98% | 15.81% |
| $SiO_2$ | 22.64% | 16.12% | 43.98% | 69.39% | 64.99% |
| $SO_3$ | 0.00% | 6.49% | 0.52% | 0.00% | 0.45% |
| $K_2O$ | 0.55% | 3.30% | 1.75% | 4.50% | 2.71% |
| CaO | 5.53% | 46.92% | 8.25% | 6.76% | 7.97% |
| $TiO_2$ | 2.40% | 0.23% | 0.99% | 0.11% | 0.63% |
| $Mn_2O_3$ | 0.08% | 0.11% | 0.04% | 0.03% | 0.07% |
| $Fe_2O_3$ | 2.59% | 2.18% | 19.07% | 1.25% | 5.81% |
| ZnO | 0.00% | 0.14% | 0.02% | 0.00% | 0.02% |
| SrO | 0.04% | 0.02% | 0.08% | 0.01% | 0.02% |
| LOI | 0.11% | 19.11% | 2.285% | 5.71% | 0.77% |

Thus, as is evident from the tables above, high-alumina refractory aluminosilicate pozzolan may comprise a higher amount of either or both of aluminum and alumina as compared to other fillers. Thus, a binder composition comprising high-alumina refractory aluminosilicate pozzolan may comprise a higher amount of such materials. For instance, the high-alumina refractory aluminosilicate pozzolan incorporated into a binder composition according to some embodiments may comprise greater than 50 wt % mullite. In certain embodiments, the high-alumina refractory aluminosilicate pozzolan may comprise greater than any one of 30, 35, 40, 45, 50, 55, 60, 65, and 70 wt % mullite. In some embodiments, the high-alumina refractory aluminosilicate pozzolan may comprise corundum. In certain embodiments, the high-alumina refractory aluminosilicate pozzolan may comprise greater than any one of 10, 15, 20, 25, and 30% corundum. Similarly, high-alumina refractory aluminosilicate pozzolan incorporated into binder compositions according to some embodiments may include substantially no amorphous (non-crystalline) material.

Any amount of high-alumina refractory aluminosilicate pozzolan may be used in a binder composition, so long as other materials are included in relative amounts consistent with those described herein. Binder compositions according to some embodiments may include 0.1 lb or more of high-alumina refractory aluminosilicate pozzolan. In some embodiments, that amount may be 0.5 lb or more; and in certain embodiments, the low end of the range of possible weights of high-alumina refractory aluminosilicate pozzolan included in the binder composition may be any one of: 1, 2, 3, 4, 5, 6, 10, 20, 30, 40, 50, 60, 70, 80, 90, 100, 150, 200, 250, 300, 350, 400, 500, 750, 1000, 1500, and 2000 lb. Any weight, integer or non-integer, between the immediately preceding values may be a minimum amount of high-alumina refractory aluminosilicate pozzolan in some embodiments.

Furthermore, the high-alumina refractory aluminosilicate pozzolan may be included in a binder composition according to some embodiments in a crushed, powder, or other similar particulate form. In some embodiments, a binder composition may include high-alumina refractory aluminosilicate particulates of U.S. mesh size 4 and smaller. In some embodiments, mesh size of high-alumina refractory aluminosilicate particulates may be U.S. mesh size 10 and smaller. An upper limit of U.S. mesh size of high-alumina refractory aluminosilicate particulates according to various embodiments may be any one of: 80, 70, 60, 50, 40, 35, 30, 25, 20, 18, 16, 14, 12, 10, 8, 7, 6, and 4 U.S. mesh size. Although some embodiments include no lower limit to high-alumina refractory aluminosilicate particulate size, other embodiments may include a lower size limit. For instance, a lower limit of U.S. mesh size of high-alumina refractory aluminosilicate particulates according to various embodiments may be any one of: 400, 325, 270, 230, 200, 170, 140, 120, 100, 80, 70, 60, 50, 40, 30, 25, 20, 18, 16, 14, 12, 10, 8, 7, and 6 U.S. mesh size. Thus, a binder composition according to some embodiments may include high-alumina refractory aluminosilicate particulates sized in any one or more of the following exemplary ranges: about 400 to 80 U.S. mesh size; about 400 to 200 U.S. mesh size; about 100 to 30 U.S. mesh size; about 80 to 60 U.S. mesh size; about 80 to about 18 U.S. mesh size; etc.

The binder composition may further include an accelerant. Any compound that decreases set time of the binder composition (that is, the time it takes for the binder composition to set to a particular compressive strength) may be a suitable accelerant. Examples of accelerants according to some embodiments include: water-soluble calcium halides such as calcium chloride ($CaCl_2$), calcium bromide ($CaBr_2$), and calcium iodide ($CaI_2$). Other exemplary accelerants may additionally impart corrosion-resistant properties to a set binder composition including such accelerants. For instance, an accelerant in some embodiments may comprise a phosphate, which may additionally impart corrosion-resistant properties to a set binder composition. Any type of soluble phosphate may be used, including, but not limited to, vitreous sodium phosphates, sodium hexametaphosphates, sodium polyphosphates, sodium tripolyphosphates, sodium orthophosphates, sodium metaphosphates, ammonium hexametaphosphates, ammonium polyphosphates, ammonium tripolyphosphates, ammonium orthophosphates, and ammonium metaphosphates. Other examples may include any hexametaphosphate, tripolyphosphate, orthophosphate, metaphosphate, and/or other polyphosphate. Further examples include a salt of any of the foregoing. Mixtures or combinations of any two or more of the foregoing may instead or in addition be employed in some embodiments. In some embodiments, the presence of a phosphate in the binder composition may alter the chemistry of in situ cementitious material formation so as to form compounds resistant to corrosion by, e.g., chemicals encountered in a borehole penetrating a subterranean formation (both natural and those added during oil, gas, and other subterranean compound recovery operations). For example, it is believed that, inter alia, a soluble phosphate may combine with calcium aluminate that may be formed by reaction between a calcium ion source and the high-alumina refractory aluminosilicate pozzolan. Reaction of the phosphate with the calcium aluminate may form calcium phosphate in the form of hydroxyapatite, which may be resistant to corrosion. Resistance may be with respect to any one or more of: flowing acid, $CO_2$, $H_2S$, and combinations thereof, among others. Furthermore, in some embodiments, an accelerant may be selected based at least in part upon its ability to impart different set characteristics to a binder composition. For instance, an accelerant like $CaCl_2$ may result in a longer set time, but reach an ultimately higher compressive strength, as compared to a faster-setting binder composition comprising a phosphate accelerant, which may reach an ultimate compressive strength lower than that of embodiments including $CaCl_2$. One of ordinary skill in the art with the benefit of this disclosure will be able to determine an accelerant that best suits the needs of a particular application.

An accelerant according to some embodiments may be substantially solid (e.g., sodium hexametaphosphate). Solid accelerants may include powders, grogs, crushed materials, and the like. An accelerant according to certain embodiments may be dissolved or suspended in solution (e.g., it may be provided in aqueous solution). In such instances, amounts of accelerant included in the binder composition are in terms of the mass of accelerant within the solution (not total mass of the solution). One or more accelerants may be included in the binder compositions of some embodiments in the range of from about 1% to about 10% bwop. The low end of the range of accelerant(s) present in some embodiments may be any one of about 1, 2, 3, 4, 5, 6, 7, 8, and 9% bwop. In some embodiments, the low end of the range of the amount of accelerant present may be a non-integer, such as any interval of tenths of percentages (or other interval) between any two of the immediately aforementioned numbers (e.g., 1.3% bwop, 7.5% bwop, 8.6% bwop, etc.). The high end of the range of accelerant(s) present in some embodiments may be any one of about 2, 3, 4, 5, 6, 7, 8, 9, and 10% bwop. The high end of the range of the accelerant present may likewise, in some embodiments, be a non-integer, such as any interval of tenths of percentages (or other interval) between any two of the immediately aforementioned numbers (e.g., 3.15% bwop, 7.5% bwop, 8.6% bwop, 9.68% bwop, etc.). Thus, suitable exemplar ranges according to the foregoing may include, e.g., about 4.5% bwop-8.5% bwop; about 2.15% bwop -5.20% bwop; about 6.00% bwop-10.00% bwop; etc.

A binder composition according to some embodiments may in addition or instead include a phosphate compound that may or may not be (or otherwise act as) an accelerant. For instance, in certain embodiments, an included phosphate compound may impart chemical resistance properties to a binder composition, regardless of whether that phosphate compound also acts as an accelerant. Examples of suitable phosphate compounds include those previously discussed above. In such embodiments, a phosphate compound may be included in the binder composition in any amount (bwop) in which an accelerant may be included, as set forth above. Any one or more of various other additives may also or instead be included in the binder compositions of some embodiments, including any one or more of: set retarders, microspheres, ground rubber particles, carbon fibers, surfactants, fluid loss control additives, weighting materials, dispersants, and the like.

For example, some embodiments may include one or more set retarders. A "set retarder" as used herein is an additive that retards the setting of binder compositions according to some embodiments. A set retarder may comprise a water-soluble carboxylic acid, examples of which include, but are not limited to: malic acid, lactic acid, acetic acid, tartaric acid, citric acid, and formic acid. A set retarder of some embodiments may instead or in addition comprise any one or more of the following: ammonium, alkali metals, alkaline earth metals, metal salts of sulfoalkylated lignins, hydroxycarboxy acids, copolymers comprising acrylic acid and/or maleic acid, and combinations thereof. One example of a suitable sulfoalkylate lignin comprises a sulfomethylated lignin. Suitable set retarding additives according to some embodiments are commercially available from Halliburton Energy Services, Inc. under the trade names "HR® 4," HR® 5," "HR® 7," "HR® 12," "HR® 15," "HR® 25," "SCR™ 100," and "SCR™ 500." One or more set retarders according to some embodiments may be included in amounts sufficient to retard the setting of the binder composition until a desired time after the binder composition has been placed in a subterranean formation. More particularly, the set retarder may be included in the binder compositions of some embodiments in an amount in the range of from about 0.1% to about 5.0% bwop. In some embodiments, the set retarder(s) may be present in the binder composition in an amount as little as any one of about 0.1, 0.5, 1, 1.5, 2.0, 2.5, 3.0, 3.5, and 4.0% bwop. In some embodiments, the set retarder(s) may be present in an amount as little as any non-integer % bwop between any two of the immediately aforementioned percentages. The set retarder may be present in some embodiments in an amount as great as any one of about 0.5, 1, 1.5, 2.0, 2.5, 3.0, 3.5, 4.0, 4.5, and 5.0% bwop. In some embodiments, the set retarder(s) may be present in an amount as great as any non-integer % bwop between any two of the immediately aforementioned percentages. In some embodiments, two or more set retarders may be included in a binder composition in a combined amount in accordance with the above-listed amounts. Under some conditions, such as high temperature placement of a binder composition, a combination of retarders may positively affect either or both of set time and pump time of the binder composition.

Microspheres are another example of an additive suitable for inclusion in cement compounds of some embodiments. Microspheres may, inter alia, reduce the density of binder compositions according to some embodiments. Any microspheres that are compatible with a subterranean binder composition, e.g., that are chemically stable over time upon incorporation into the binder composition, may be used. An example of a suitable microsphere is commercially available from Halliburton Energy Services, Inc. of Houston, Tex. under the trade name "SPHERELITE®." Where included, microspheres may be present in binder compositions of some embodiments in an amount sufficient to provide a binder composition having a density in a desired range. For example, microspheres may be present in an amount in the range of from about 10%-80% bwop. In some embodiments, microspheres may be present in the binder composition in an amount as little as any one of about 10, 15, 20, 25, 30, 35, 40, 45, 50, 55, and 60% bwop. In some embodiments, the microspheres may be present in an amount as little as any integer or non-integer % bwop between any two of the immediately aforementioned percentages. Microspheres may be present in some embodiments in an amount as great as any one of about 15, 20, 25, 30, 35, 40, 45, 50, 55, 60, 65, 70, 75, and 80% bwop. In some embodiments, microspheres may be present in an amount as great as any integer or non-integer % bwop between any two of the immediately aforementioned percentages.

Ground rubber particles are another example additive according to some embodiments. Ground rubber particles may be included, inter alia, to provide elasticity and/or ductility to the binder compositions of some embodiments. Such particles may be produced, e.g., from tires. Ground rubber particles according to some embodiments may have a mean length of less than about ¼", and they may be capable of passing through a filter having a U.S. mesh size of about 10/20 and 20/30. Where included, the ground rubber particles may be present in binder compositions of some embodiments in an amount sufficient to provide a desired degree of ductility to the binder composition, e.g., in an amount ranging from about 10% to about 30% bwop. In some embodiments, ground rubber particles may be present in the binder composition in an amount as little as any one of about 10, 15, 20, and 25% bwop. In some embodiments, the ground rubber particles may be present in an amount as little as any integer or non-integer % bwop between any two of the immediately aforementioned percentages. Ground rubber particles may be present in some embodiments in an amount as great as any one of about 15, 20, 25, and 30% bwop. In some embodiments, ground rubber particles may be present in an amount as great as any integer or non-integer % bwop between any two of the immediately aforementioned percentages. Ground rubber particles, like microspheres, may be incorporated into the binder composition at any of various stages (e.g., dry mixing, mixing with fluid before mixing the fluid with the unhydrated cement, and/or mixing with the binder composition after it has been mixed with fluid to form a slurry).

Carbon fibers may be included in some embodiments in order to, inter alia, increase the tensile strength of the binder composition. Carbon fibers suitable for inclusion in such embodiments may have a high tensile strength and/or a high tensile modulus. In certain exemplary embodiments, the tensile modulus may be about 180 GPa or higher, and the tensile strength of the fibers may be about 3000 MPa or higher. The fibers preferably have a mean length of about 1 mm or less. In certain exemplary embodiments, the mean length of the carbon fibers is from about 50 to about 500 microns; in other embodiments, about 100 to about 200 microns. The mean fiber length may be as low as any one of about 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 250, 300, 350, 400, and 450 microns. In some embodiments, the carbon fibers may have a mean length as low as any integer or non-integer length between any two of the immediately aforementioned micron lengths. The mean fiber length may be as great as any one of about 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 250, 300, 350, 400, 450, and 500 microns. In some embodiments, the carbon fibers may have a mean length as great as any integer or non-integer length between any two of the immediately aforementioned micron lengths. Carbon fibers may be milled carbon fibers, examples of which include "AGM-94," "AGM-99," and "AGM-95" carbon fibers commercially available from Asbury Graphite Mills, Inc. of Asbury, N.J. "AGM-94" fibers, for example, have a mean length of about 150 microns and a diameter of about 7.2 microns. "AGM-99" carbon fibers, for example, have a mean length of about 150 microns and a diameter of about 7.4 microns. Generally, carbon fibers may be present in an amount sufficient to enable the set cement to achieve a desired tensile strength. The carbon fibers may be present in the binder compositions of some embodiments in an amount in the range of from about 1% to about 15% bwop. In some embodiments, carbon fibers may be present in the binder composition in an amount as little as any one of about 1, 2, 3, 4, 5, 6, 7, 8, 9, 10, 11, 12, 13, and 14% bwop. In some embodiments, the carbon fibers may be present in an amount as little as any non-integer % bwop between any two of the immediately aforementioned percentages. Carbon fibers may be present in some embodiments in an amount as great as any one of about 2, 3, 4, 5, 6, 7, 8, 9, 10, 11, 12, 13, 14, and 15% bwop. In some embodiments, carbon fibers may be present in an amount as great as any non-integer % bwop between any two of the immediately aforementioned percentages.

As previously noted, other example additives suitable for inclusion in the binder compositions of some embodiments include accelerants, surfactants, fluid loss control additives, weighting materials, dispersants, gas-generating additives, lost-circulation materials, filtration-control additives, defoaming agents, oil-swellable particles, water-swellable particles, thixotropic additives, and combinations thereof. An example of a suitable fluid loss control additive, for example, is a styrene-butadiene latex commercial available from Halliburton Energy Services, Inc. of Duncan, Okla., under the trade designation "LATEX 3000™." Cationic starches may also be suitable fluid loss control additives. Further specific examples of additives include crystalline silica, amorphous silica, fumed silica, salts, fibers, hydratable clays, rice husk ash, elastomers, elastomeric particles, resins, latex, combinations thereof, and the like. For example, lost-circulation materials may help prevent the loss of fluid circulation into the subterranean formation, and may include cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls. By way of further example, defoaming agents may reduce tendency of binder compositions according to some embodiments to foam during mixing and/or pumping of the compositions. Examples of suitable defoaming additives include, but are not limited to, polyol silicone compounds. In addition, thixotropic additives may provide a binder composition that can be pumpable as a thin or low-viscosity fluid, but when allowed to remain quiescent attains a relatively high viscosity. Examples of suitable thixotropic additives include gypsum, water soluble carboxyalkyl, hydroxyalkyl, mixed carboxyalkyl hydroxyalkyl, cellulose, polyvalent metal salts, zirconium oxychloride with hydroxyethyl cellulose, and combinations thereof.

Additives may be incorporated into the binder compositions of various embodiments by any suitable means. For example, additives may be dry blended with the unhydrated cement before the addition of a fluid such as water, by mixing with the fluid to be added to the cement, or by mixing with the cement slurry consecutively with, or after, the addition of the fluid. In some embodiments, additives may be pre-suspended in water and injected into the cement mix fluid or into the cement slurry as an aqueous slurry. In certain embodiments, liquid additives (or suspended additives, as noted) may be mixed with a fluid such as water; solid additives may be mixed with the unhydrated cement; and then the fluid and unhydrated cement (plus respective additives mixed therewith) may be mixed together to form a pumpable slurry. Examples of liquid additives may include set retarders, accelerants, surfactants, fluid loss control additives, and dispersants. In some embodiments, any one or more of these liquid additives may be employed in solid form instead of or in addition to their liquid form. Examples of solid additives may include rubber particles, carbon fibers, microspheres, and weighting materials.

The binder compositions of certain embodiments may be low-density binder compositions, particularly when formed into a pumpable slurry. For example, the binder compositions of some embodiments may comprise foamed binder composition slurries. When foamed, the binder compositions may include an expanding additive present in an amount sufficient to foam the binder composition to a desired density. Optionally, where the binder composition is foamed, foaming agents and/or foam stabilizing agents may be included in the binder composition in order to facilitate the foaming. In some embodiments, a surfactant comprising a foaming agent and/or foam stabilizing agent may be incorporated into the binder composition. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition may include a mixture of an ammonium salt of an alkyl ether sulfate, a cocoamidopropyl betaine surfactant, a cocoamidopropyl dimethylamine oxide surfactant, sodium chloride, and water. A suitable example of such a mixture is "ZONESEAL® 2000" foaming additive, commercially available from Halliburton Energy Services, Inc. When used, the foaming agent and/or foam stabilizing agent may be present in the binder compositions of some embodiments in an amount sufficient to generate a stable foam. In certain exemplary embodiments, the foaming agent and/or foam stabilizing agent may be present in an amount ranging from about 0.5% to about 5% by weight of water in the composition; in other embodiments, in a range from about 1% to about 2% by weight of water. In addition, an expanding additive may be used to foam the binder composition of some embodiments. A gas such as air, nitrogen, or a mixture of both, maybe used. In certain exemplary embodiments, nitrogen may be used. Where included, the expanding additive may be present in the binder composition in an amount sufficient to adjust the density of the binder composition to a desired value. In certain exemplary embodiments where an expanding additive has been added to the binder composition, the foamed binder composition may have a density in the range of from about 10.5 to about 17.5 lb/gal, or in some embodiments in the range of from about 11.5 to about 12.5 lb/gal.

Foamed binder compositions may be prepared in accordance with any suitable mixing technique. For example, a quantity of water may be introduced into a cement or other blender, followed by each of the calcium ion source, the high-alumina refractory aluminosilicate pozzolan, and the accelerant, if any. The mixture may be agitated for a sufficient period of time to form a pumpable non-foamed slurry. The slurry may then be pumped to the well bore and the foaming agent and/or foam stabilizing agent followed by the expanding additive may be injected into the slurry on the fly. As the slurry and expanding additive flow through the well bore to the location where the resulting foamed binder composition is to be placed, the binder composition may be foamed and stabilized. Other additives used, if any, may be added to the water prior to when the calcium ion source and high-alumina refractory aluminosilicate pozzolan are mixed therewith. This may be particularly desirable for liquid and/or solvated and/or suspended additives. Additives may also or instead be added to the calcium ion source and/or high-alumina refractory aluminosilicate pozzolan prior to mixing. This may be particularly desirable for solid-phase additives.

While binder compositions according to various embodiments may be suitable for a number of different cementing operations, they may be particularly suitable for methods of cementing in a subterranean formation. For example, a binder composition according to some embodiments may be used in primary and/or remedial cementing operations in which the binder composition may be introduced into a subterranean formation, constituents of the binder composition allowed to react to form cementitious material in situ, and the binder composition subsequently allowed to set. As used herein, introducing the binder composition into a subterranean formation includes introduction into any portion of the subterranean formation, including, without limitation, into a well bore drilled into the subterranean formation, into a near well bore region surrounding the well bore, or into both.

In primary cementing embodiments, for example, a binder composition comprising water, a calcium ion source, and a high-alumina refractory aluminosilicate pozzolan may be introduced into a space between a wall of a well bore and a conduit (e.g., pipe strings, liners) located in the well bore, the well bore penetrating the subterranean formation. A plurality of constituents within the binder composition may be allowed to react to form a binder composition comprising cementitious material, and subsequently the binder composition may be allowed to set to form an annular sheath of hardened cement in the space between the well bore wall and the conduit. Among other things, the binder composition may form a barrier, preventing the migration of fluids in the well bore. The binder composition also may, for example, support the conduit in the well bore.

In remedial cementing embodiments, a binder composition comprising water, a calcium ion source, and a high-alumina refractory aluminosilicate pozzolan may be used, for example, in squeeze-cementing operations or in the placement of cement plugs. By way of example, a slurry of the binder composition may be placed in a well bore, and a plurality of constituents within the binder composition may be allowed to react to form a binder composition comprising cementitious material, whereby the binder composition may set so as to plug an opening, such as a void or crack, in the formation, in a gravel pack, in the conduit, in the cement sheath, and/or a microannulus between the cement sheath and the conduit.

In some embodiments, a binder composition comprising water, a non-cementitious calcium ion source, and a non-cementitious high-alumina refractory aluminosilicate pozzolan may be exposed to temperatures and/or pressures sufficient to cause the binder composition to set.

In certain embodiments, setting may include reaction or other transformation of one or more non-cementitious constituents of the binder composition into one or more settable and/or set compositions. For example, as previously noted, a calcium ion source may be or may include a non-cementitious calcium ion source; likewise, a high-alumina refractory aluminosilicate pozzolan may be non-cementitious. Inclusion of water in a binder composition comprising such non-cementitious components, and introduction to any of various suitable temperatures, pressures, and/or other conditions, may in some embodiments result in the setting of the binder composition comprising non-cementitious material. In some embodiments, such temperatures and/or pressures may be encountered downhole in the normal course of any of various subterranean cementing procedures consistent with the exemplar embodiments described herein, thereby resulting in in situ formation of a set binder composition. For instance, a binder composition comprising non-cementitious material (e.g., a non-cementitious calcium ion source and a non-cementitious high-alumina refractory aluminosilicate pozzolan) according to some embodiments may set when exposed to temperatures of 70° F. or higher, and/or pressures of 2000 psi or higher. In some embodiments, the pressure and temperature necessary to facilitate setting of a slurry of the binder composition may have an inverse relationship—that is, a higher pressure may result in a lower temperature being necessary to facilitate the reaction(s) necessary for setting, and vice versa. In certain embodiments, a binder composition may be exposed to temperatures equal to or greater than about 75° F. and thereafter the binder composition may be allowed to set. In some embodiments, the temperature of exposure for setting (e.g., set temperature) may be equal to or greater than about any of the following (in ° F.): 80, 85, 90, 95, 100, 105, 110, 115, 120, 125, 130, 135, 140, 145, 150, 155, 160, 165, 170, 175, 180, 185, 190, 200, 205, 210, 215, 220, 225, 230, 235, 240, 245, 250, 255, 260, 265, 270, 275, 280, 285, 290, 295, 300, 305, 310, 315, 320, 325, 330, 335, and so on up to 600 and higher. In certain embodiments, minimum set temperature may be any temperature value, integer or non-integer, between any two of the immediately aforementioned values. Similarly, suitable set pressure may be equal to or greater than about any of the following (in psi): 10, 15, 20, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 17000, 18000, 19000, 20000, 21000, 22000, 23000, 24000, 25000, and so on up to about 35000 and higher. In certain embodiments, minimum set pressure may be any pressure value, integer or non-integer, between any two of the immediately aforementioned values. In some embodiments, higher set temperatures and/or pressures may modify the chemistry that the binder composition undergoes during setting reactions.

Some embodiments may include setting at a first, lower, temperature and/or pressure followed by curing at a higher temperature and/or pressure. "Curing," as used herein, refers to the phenomenon that a set material may undergo when subjected to continued and/or greater temperature and/or pressure conditions. Thus, "curing" includes subsequent treatment and/or exposure of a set material to particular conditions (which may be similar to the conditions at which the material initially set, or which may be different, such as in the case of higher temperature and/or pressure conditions). For example, a binder composition may first be allowed to set at a temperature of about 200° F. or less, and subsequently subjected to a higher temperature of about 400° F. or more, which may further lead to curing of the composition. Either of the first setting and the curing may take place at any temperature from the above-listed temperatures for setting in various embodiments. Either or both of setting and curing, in some embodiments, may take place by any suitable means, for example, hydrothermal treatment. In some embodiments, setting may result from placement downhole, followed by exposure to the conditions naturally encountered in a downhole environment (e.g., heightened temperature and/or pressure). Thus, setting may include subjecting a binder composition to temperature and/or pressure conditions at a bottomhole location wherein the composition is to be set. Setting in some embodiments may instead or in addition include subjecting the binder composition to a fire flood and/or steam pumping operation (e.g., to increase the temperature and/or pressure at which the binder composition is set). Or, in certain embodiments, setting may instead or in addition include subjecting the binder composition to production conditions (e.g., production of hydrocarbon and/or other materials produced from a subterranean formation). Likewise, curing may include carrying out a fire flood, steam pumping, injection, and/or other similar operation, and combinations thereof in a subterranean formation in which the binder composition has set. And curing may also or instead include allowing the binder composition, once set, to be exposed to one or more compounds produced from a subterranean formation (e.g., hydrocarbons, formation water, or any other produced compound). Such exposure may include high-temperature and/or pressure conditions. In some embodiments, higher set temperatures and/or pressures may modify the chemistry that the binder composition undergoes during setting. For example, higher temperature may shift reaction products such that the binder composition, after setting, comprises different products and/or crystal structures than when set at lower temperatures. Similarly, curing at higher temperatures may modify the chemistry of the binder composition after it has set. For example, curing at extreme temperature and/or pressure may result in chemical transformations that give rise to high temperature crystalline phases within the set binder composition. In some instances, such processes may be similar to annealing. Accordingly, binder compositions of some embodiments may be capable of not only withstanding extreme conditions, but also adapting to further exposure to such conditions. Thus, such binder compositions may be suitable for use in any operation with extreme high temperature conditions such as production, injection, enhanced recovery techniques, fire floods, steam pumping, etc.

The exemplary binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, preparation of a binder composition in accordance with example embodiments will now be described. FIG. 1 illustrates a system 2 for preparation of a binder composition and delivery to a well bore in accordance with certain embodiments. As shown, the binder composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2A:
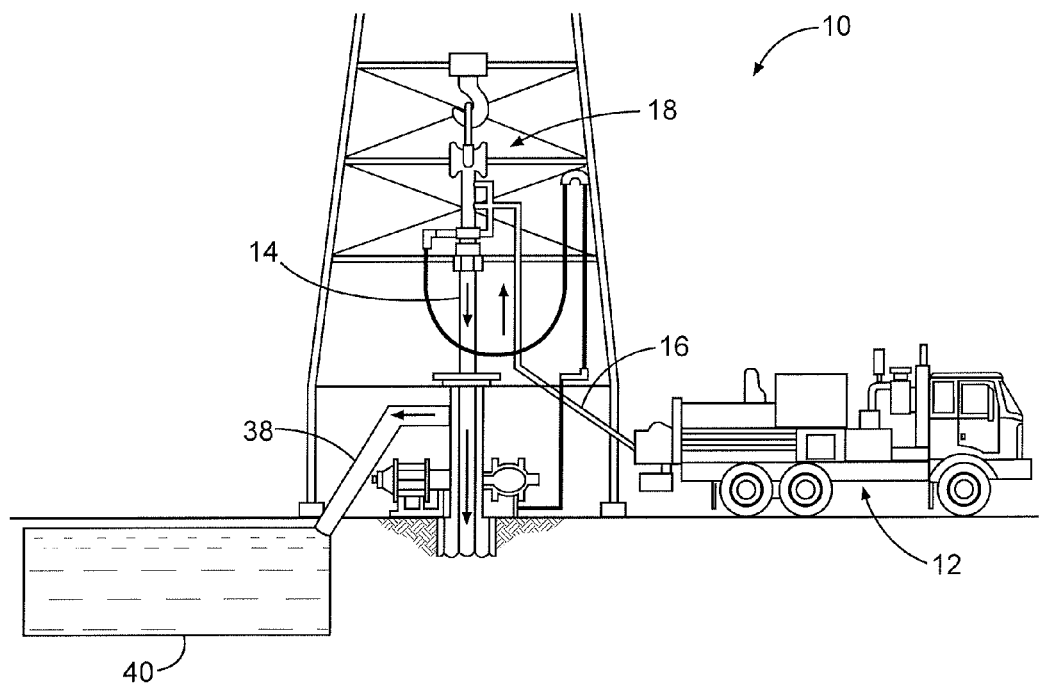
FIG. 2A illustrates surface equipment that may be used in placement of a binder composition in a well bore in accordance with aspects of the present disclosure.

An example technique for placing a binder composition into a subterranean formation will now be described with reference to FIGS. 2A and 2B. FIG. 2A illustrates surface equipment 10 that may be used in placement of a binder composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a binder composition 14 through a feed pipe 16 and to a cementing head 18 which conveys the binder composition 14 downhole.

Figure 2B:
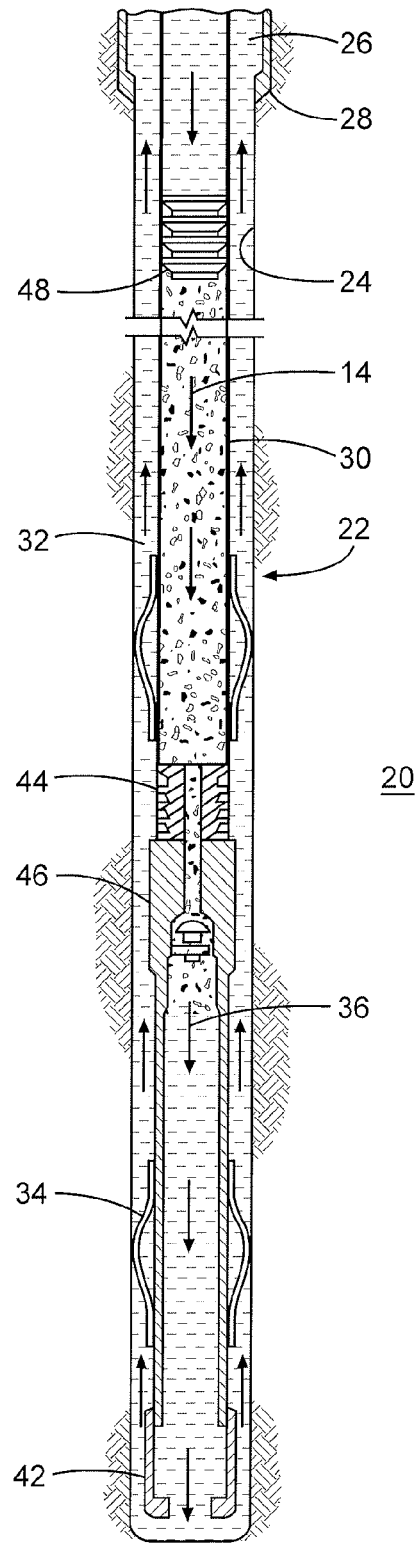
FIG. 2B illustrates placement of a binder composition into a well bore annulus in accordance with aspects of the present disclosure.

Turning now to FIG. 2B, the binder composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the binder composition 14 may be pumped down the interior of the casing 30. The binder composition 14 may be allowed to flow down the interior of the casing 30 through the casing shoe 42 at the bottom of the casing 30 and up around the casing 30 into the well bore annulus 32. The binder composition 14 may be allowed to set in the well bore annulus 32, for example, to form a cement sheath that supports and positions the casing 30 in the well bore 22. While not illustrated, other techniques may also be utilized for introduction of the binder composition 14. By way of example, reverse circulation techniques may be used that include introducing the binder composition 14 into the subterranean formation 20 by way of the well bore annulus 32 instead of through the casing 30.

As it is introduced, the binder composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the binder composition 14, for example, to separate the binder composition 14 from the fluids 36 that may be inside the casing 30 prior to cementing. After the bottom plug 44 reaches the landing collar 46, a diaphragm or other suitable device ruptures to allow the binder composition 14 through the bottom plug 44. In FIG. 2B, the bottom plug 44 is shown on the landing collar 46. In the illustrated embodiment, a top plug 48 may be introduced into the well bore 22 behind the binder composition 14. The top plug 48 may separate the binder composition 14 from a displacement fluid 50 and also push the binder composition 14 through the bottom plug 44.

In some embodiments, the present disclosure may provide a binder composition comprising water; a non-cementitious calcium ion source; and a non-cementitious high-alumina refractory aluminosilicate pozzolan. In other embodiments, the present disclosure may provide a method comprising introducing a binder composition into a subterranean formation, wherein the binder composition comprises a slurry comprising: water, a non-cementitious calcium ion source, and a non-cementitious high-alumina refractory aluminosilicate pozzolan; and allowing the binder composition to set within the subterranean formation.

To facilitate a better understanding of the present disclosure, the following examples of some of the exemplary embodiments are given. In no way should such examples be read to limit the scope of the invention.

EXAMPLE 1

Four sample binder composition slurries (Samples W, X, Y, and Z) according to some embodiments were prepared having the compositions shown in Table 3.

TABLE 3

Sample Binder Composition Slurries

| Material | Sample W, 15.6 lb/gal Amt (% bwop) | Sample W, 15.6 lb/gal Mass (g) | Sample X, 15.0 lb/gal Amt (% bwop) | Sample X, 15.0 lb/gal Mass (g) | Sample Y, 15.0 lb/gal Amt (% bwop) | Sample Y, 15.0 lb/gal Mass (g) | Sample Z, 15.3 lb/gal Amt (% bwop) | Sample Z, 15.3 lb/gal Mass (g) |
|---|---|---|---|---|---|---|---|---|
| Water | 39 | 97.5 | 39 | 200 | 48 | 242.3 | 48 | 200 |
| Firebrick Grog | 100 | 250 | 100 | 500 | 100 | 500 | 100 | 500 |
| Hydrated Lime | 20 | 50 | 20 | 100 | 20 | 100 | 20 | 100 |
| $CaCl_2$ | — | — | 6 | 30$^a$ | — | — | 6 | 30$^a$ |
| SHMP | — | — | — | — | 6 | 30 | — | — |
| Pumice | — | — | — | — | — | — | 10 | 50 |
| Dispersant | — | — | — | — | — | — | 0.4 | 2.2 |

$^a$43% aqueous solution; 30 g $CaCl_2$ required 69.8 g of solution. Water added from this solution is in addition to the water amount reported in chart.

In Table 3, SHMP is sodium hexametaphosphate, an example of an accelerant according to some embodiments. $CaCl_2$ is another example accelerant according to certain embodiments. Pumice was added to Sample Z for possible enhancement of compressive strength.

Samples W, X, and Y were each allowed to react to form a setbinder composition, which was allowed to set at 140° F. for 48 hours. After each setting, compressive strength was tested by crushing the set cylinder samples, the results of which are shown in Table 4. After setting at 140° F. for 48 hours, Sample W obtained a compressive strength (determined by crush testing) of 55.11 psi; Sample X reached 222.82 psi; and Sample Y reached 353.88. Samples W and X were further cured at 140° F. up to 7 days total, obtaining compressive strengths of 328.92 psi and 599.12 psi, respectively, as shown in Table 4. These results indicate that the inclusion of accelerant in each of Samples X and Y ($CaCl_2$ and SHMP, respectively) may have resulted in faster development of higher compressive strength in each of those samples.

TABLE 4

Compressive Strength of Sample Binder Composition Slurries Set and Cured at 140° F.

| | Sample W | Sample X | Sample Y | Sample Z |
|---|---|---|---|---|
| 48 h CS @ 140° F. (psi) | 55.11 | 222.82 | 353.88 | — |
| 7 d CS @ 140° F. (psi) | 328.93 | 599.12 | — | — |

EXAMPLE 2

Additional quantities of samples X, Y, and Z were prepared according to Table 3 and allowed to react and then cure at 190° F. for 24 hours, followed by additional curing at 190° F. up to 7 days. Compressive strength was tested by crushing cured cylinder samples. Compressive strength at the 24-hour mark and 7-day mark for each are shown below in Table 5, which indicates that the inclusion of dispersant and pumice or another siliceous pozzolan in addition to the high-alumina refractory aluminosilicate pozzolan may advantageously result in higher ultimate compressive strength after long periods of time while still retaining the heat- and corrosion-resistance imparted to the end material in part by the high-alumina refractory aluminosilicate pozzolan.

TABLE 5

Compressive Strength of Sample Binder Composition Slurries Set and Cured at 190° F.

| | Example W | Example X | Example Y | Example Z |
|---|---|---|---|---|
| 24 h CS @ 190° F. (psi) | — | 64.7 | 530.61 | 548.89 |
| 7 d CS @ 190° F. (psi) | — | 559.24 | 567 | 2983.82 |

In addition, X-ray diffraction (XRD) analysis was performed on each of Samples X and Y after 24 hours at 190° F. and after 7 days at 190° F. This XRD analysis, as reported in Tables 6 and 7 for each of samples X and Y, respectively, shows that phases remained intact for each at 190° F., although some shifts in reaction products comprising the set binder composition were apparent after the additional curing time. No portlandite appears in either set binder composition.

TABLE 6

XRD Analysis of Sample X, 190° F. Cures

| | | 190° F., 24 h | 190° F., 7 d |
|---|---|---|---|
| Mullite | $Al_6Si_2O_{13}$ | 68% | 75% |
| Corundum | $Al_2O_3$ | trace | trace |
| Quartz | $SiO_2$ | 6% | 5% |
| Cristobalite | $SiO_2$ | 15% | 12% |
| Calcite | $CaCO_3$ | 7% | 7% |
| Hatrurite | ($C_3S$) | 1% | 1% |
| Larnite | ($C_2S$) | — | — |
| Brownmillerite | ($C_4AF$) | — | — |
| Tobermorite | $Ca_5Si_6O_{17}\,5H_2O$ | — | — |
| Hydrocalumite | $Ca_2Al(OH)_7\,3H_2O$ | 3% | — |

TABLE 7

XRD Analysis of Sample Y, 190° F. Cures

| | | 190° F., 24 h | 190° F., 7 d |
|---|---|---|---|
| Mullite | $Al_6Si_2O_{13}$ | 68% | 68% |
| Corundum | $Al_2O_3$ | 1% | 1% |
| Quartz | $SiO_2$ | 6% | 6% |
| Cristobalite | $SiO_2$ | 16% | 15% |
| Calcite | $CaCO_3$ | 2% | 2% |
| Hatrurite | ($C_3S$) | 2% | 4% |
| Larnite | ($C_2S$) | 4% | 3% |

TABLE 7-continued

XRD Analysis of Sample Y, 190° F. Cures

| | | 190° F., 24 h | 190° F., 7 d |
|---|---|---|---|
| Brownmillerite | (C$_4$AF) | 1% | 1% |
| Tobermorite | Ca$_5$Si$_6$O$_{17}$ 5H$_2$O | — | — |

EXAMPLE 3

Additional quantities of samples X and Y were prepared according to Table 3 and allowed to react and set at 190° F. for 24 hours, then transferred to an autoclave and further cured at 550° F. for 7 days. However, in this specific instance, Sample X required additional water during mixing, thereby lowering its density relative to the Sample X reported in Table 3. Compressive strength was tested by crushing cured cylinder samples. Compressive strength in each after the 550° F. cure is shown below in Table 8, which indicates compressive strength in Sample X lower than that reached at 190° F. cure, while Sample Y exhibited significantly higher ultimate compressive strength at the 550° F. cure as compared to the 190° F. cure. A possible explanation may be the additional water introduced to Sample X during mixing.

TABLE 8

Compressive Strength of Sample Binder Composition Slurries Set at 190° F. and Cured at 550° F.

| | Example W | Example X | Example Y | Example Z |
|---|---|---|---|---|
| 7 d CS @ 550° F. (psi) | — | 421.81 | 1013.66 | — |

In addition, XRD analysis was performed on each of Samples X and Y after 7 days at 550° F. in the autoclave. This XRD analysis, as reported in Tables 9 and 10 for each of samples X and Y, respectively, shows that phases still remained intact for each at 550° F., and portlandite is still not present in either set binder composition.

TABLE 9

XRD Analysis of Sample X, 550° F. Cure

| | | 550° F., 7 d |
|---|---|---|
| Mullite | Al$_6$Si$_2$O$_{13}$ | 67% |
| Corundum | Al$_2$O$_3$ | 1% |
| Quartz | SiO$_2$ | 4% |
| Cristobalite | SiO$_2$ | 11% |
| Calcite | CaCO$_3$ | 1% |
| Hatrurite | (C$_3$S) | 2% |
| Larnite | (C$_2$S) | 2% |
| Brownmillerite | (C$_4$AF) | trace |
| Tobermorite | Ca$_5$Si$_6$O$_{17}$ 5H$_2$O | 12% |
| Hydrocalumite | Ca$_2$Al(OH)$_7$ 3H$_2$O | — |

TABLE 10

XRD Analysis of Sample Y, 550° F. Cure

| | | 550° F., 7 d |
|---|---|---|
| Mullite | Al$_6$Si$_2$O$_{13}$ | 67% |
| Corundum | Al$_2$O$_3$ | 1% |
| Quartz | SiO$_2$ | 6% |

TABLE 10-continued

XRD Analysis of Sample Y, 550° F. Cure

| | | 550° F., 7 d |
|---|---|---|
| Cristobalite | SiO$_2$ | 10% |
| Calcite | CaCO$_3$ | 1% |
| Hatrurite | (C$_3$S) | 4% |
| Larnite | (C$_2$S) | 4% |
| Brownmillerite | (C$_4$AF) | 1% |
| Tobermorite | Ca$_5$Si$_6$O$_{17}$ 5H$_2$O | 6% |

Figure 3:
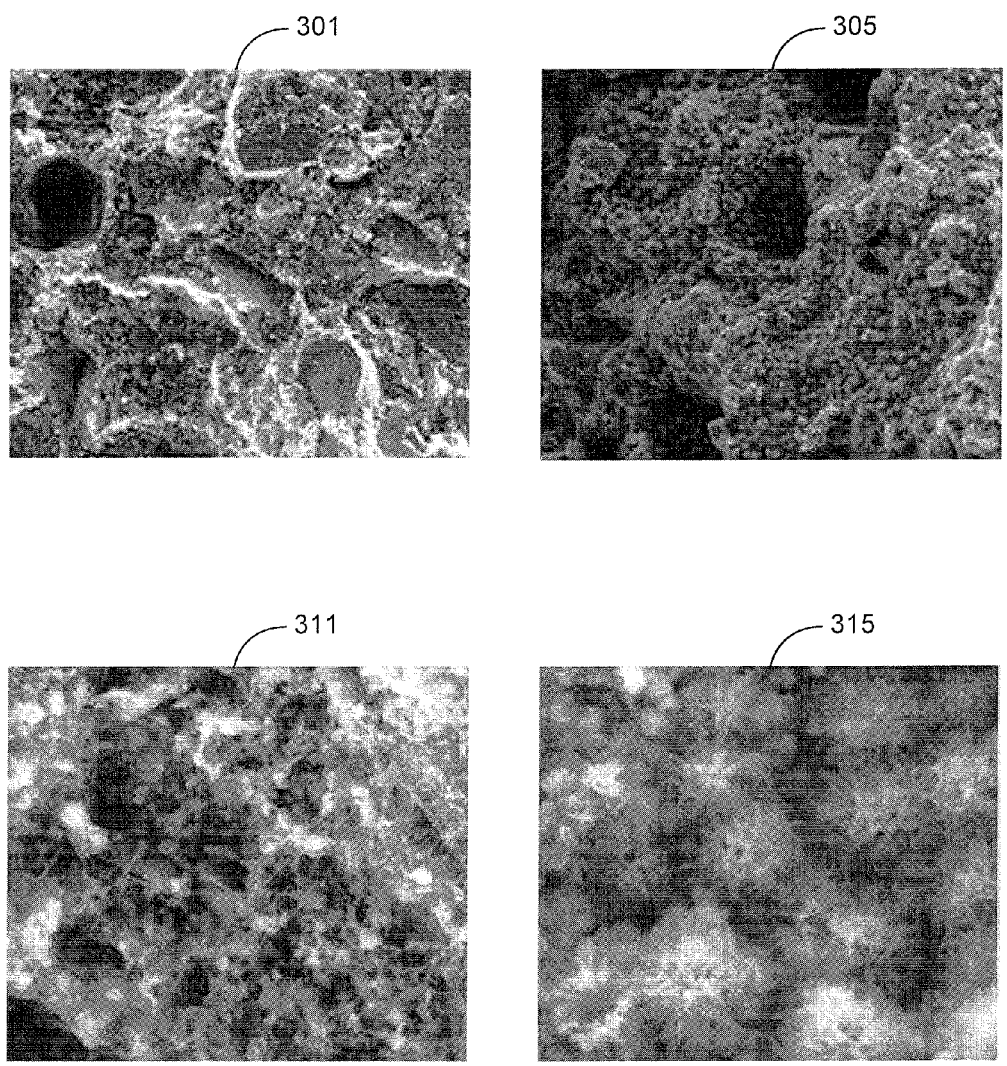
FIG. 3 is a series of scanning electron microscopy (SEM) images of sample binder compositions according to aspects of the present disclosure.

Furthermore, scanning electron microscopy (SEM) images, shown in FIG. 3, were compared for Sample Y cured at 190° F. (7 days) and 550° F. (7 days), according to each of Examples 2 and 3, respectively. The 550° F. cure in accordance with Example 3 at 200× magnification (305) demonstrated formation of a high degree of crystalline material (in particular, clusters of tiny crystals). On the other hand, the samples cured according to Example 2 at 190° F. at 200× magnification (311) showed little to none of the crystalline curing, but instead a wispy, largely non-crystalline material. The 190° F. cure shown at 2000× magnification (311) gives a more detailed look at the wispy material resulting from the 190° F. cure. The 2000× image of 550° F. cure (315) shows that the clusters of tiny crystals are bundles of tiny wispy crystals.

EXAMPLE 4

Additional quantities of samples X and Y were prepared according to Table 3 and allowed to react and cure at 200° F. for 25 hours. The samples were analyzed over time by ultrasonic cement analyzer (UCA), which showed slow development of early strength in Sample X, but continuous building of strength throughout the test period. On the other hand, the UCA analysis demonstrated rapid development of strength in Sample Y, but with little to no increase of strength throughout the remainder of the test period. This may be a result of the different accelerants used in each sample: CaCl$_2$ (Sample X) versus SHMP (Sample Y). Furthermore, the ultimate compressive strengths shown by UCA analysis of each sample are consistent with the results obtained from crushing cured cylinder samples of X and Y, as shown in Table 5.

EXAMPLE 5

The composition of Sample Y having been prepared, set, and cured as reported in Example 3 was further analyzed using XRD analysis with Rietveld Full-Pattern Refinement and Energy Dispersive X-Ray Fluorescence (XRF). The XRD and Rietveld analysis resulted in a modified conclusion as to composition of Sample Y following the setting at 190° F. for 24 hours and further cure at 550° F. for 7 days, as shown in Table 11.

TABLE 11

XRD + Rietveld Analysis of Sample Y, 550° F. Cure

| | | 550° F., 7 d |
|---|---|---|
| Mullite | Al$_6$Si$_2$O$_{13}$ | 50% |
| Corundum | Al$_2$O$_3$ | 2% |
| Quartz | SiO$_2$ | 1% |
| Cristobalite | SiO$_2$ | 1% |
| Dmisteinbergite | CaSi$_2$Al$_2$O$_8$ | — |
| Boehmite | AlOOH | — |

TABLE 11-continued

XRD + Rietveld Analysis of Sample Y, 550° F. Cure

|  |  | 550° F., 7 d |
|---|---|---|
| Kaolinite | — | 1% |
| Hydroxyapatite | Ca$_5$(PO$_4$)$_3$OH | 4% |
| Tobermorite | Ca$_5$Si$_6$O$_{17}$ 5H$_2$O | 6% |
| Amorphous | non-crystalline | 32% |
| Other[a] | — | 3% |

[a]indicates presence of species unidentifiable by XRD

TABLE 12

XRF Analysis of Sample Y, 550° F. Cure

| O | 53.0% |
|---|---|
| Na | 0.7% |
| Mg | 0.2% |
| Al | 9.4% |
| Si | 18.0% |
| P | 2.3% |
| K | 0.9% |
| Ca | 14.1% |
| Ti | 0.8% |
| Fe | 0.6% |

The updated analyses of Sample Y's structure show the presence of phosphorous, and of hydroxyapatite, which is likely due to the inclusion of the phosphate compound SHMP in Sample Y.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A binder composition comprising:
water;
a non-cementitious calcium ion source; and
a non-cementitious high-alumina refractory aluminosilicate pozzolan having a ratio of alumina to silica greater than about 0.7.

2. The binder composition of claim 1 wherein the calcium ion source comprises a compound selected from the group consisting of: hydrated lime, quick lime, a calcium salt in the presence of a hydroxide ion source, and combinations thereof.

3. The binder composition of claim 1 wherein the high-alumina refractory aluminosilicate pozzolan comprises mullite in an amount greater than 50% by weight of the high-alumina refractory aluminosilicate pozzolan.

4. The binder composition of claim 3 wherein the high-alumina refractory aluminosilicate pozzolan is substantially free of amorphous material.

5. The binder composition of claim 1 wherein the high-alumina refractory aluminosilicate pozzolan comprises a compound selected from the group consisting of: crushed firebrick, firebrick grog, a mixture of silicate and corundum, a mixture of silicate and high-alumina ceramic, a mixture of silicate and bauxite, corundum, high-alumina ceramic, mullite, fused mullite, and combinations thereof.

6. The binder composition of claim 1 wherein the high-alumina refractory aluminosilicate pozzolan comprises particulates sized 20 U.S. mesh size and smaller.

7. The binder composition of claim 1 further comprising a phosphate compound.

8. The binder composition of claim 1 further comprising an accelerant that comprises a compound selected from the group consisting of: calcium chloride; calcium bromide; calcium iodide; phosphate, hexametaphosphate, tripolyphosphate, orthophosphate, metaphosphate, polyphosphate, a salt of any one of the foregoing, and combinations thereof.

9. The binder composition of claim 8 wherein:
the calcium ion source is present in the binder composition in an amount in the range of from about 20% to about 70% by weight of the high-alumina refractory aluminosilicate pozzolan; and
the accelerant is present in the binder composition in an amount in the range of from about 1% to about 30% by weight of the high-alumina refractory aluminosilicate pozzolan.

10. A method of cementing comprising:
introducing a binder composition into a subterranean formation, wherein the binder composition comprises a slurry comprising:
water,
a non-cementitious calcium ion source, and
a non-cementitious high-alumina refractory aluminosilicate pozzolan having a ratio of alumina to silica greater than about 0.7;
allowing one or more components of the binder composition to react to form a settable binder composition; and
allowing the settable binder composition to set within the subterranean formation.

11. The method of claim 10 wherein the one or more components of the binder composition react to form a settable binder composition in the subterranean formation.

12. The method of claim 10 wherein:
the non-cementitious calcium ion source comprises a compound selected from the group consisting of: hydrated lime, quick lime, a calcium salt in the presence of a hydroxide ion source, and combinations thereof; and
the non-cementitious high-alumina refractory aluminosilicate pozzolan comprises a compound selected from the group consisting of: firebrick, firebrick grog, a mixture of silicate and corundum, a mixture of silicate and high-alumina ceramic, a mixture of silicate and bauxite, corundum, high-alumina ceramic, and combinations thereof.

13. The method of claim 10 wherein the binder composition further comprises a phosphate compound.

14. The method of claim 10 wherein the binder composition further comprises an accelerant selected from the group consisting of: calcium chloride; calcium bromide;

calcium iodide; phosphate, hexametaphosphate, tripolyphosphate, orthophosphate, metaphosphate, polyphosphate, and combinations thereof.

15. The method of claim 14 wherein:
the non-cementitious calcium ion source is present in the binder composition in an amount in the range of from about 20% to about 70% by weight of the non-cementitious high-alumina refractory aluminosilicate pozzolan; and
the accelerant is present in the binder composition in an amount in the range of from about 1% to about 30% by weight of the high-alumina refractory aluminosilicate pozzolan.

16. The method of claim 15 further comprising curing the binder composition at a temperature of about 400° F. or higher subsequent to allowing the binder composition to set.

17. The method of claim 10 wherein allowing the non-cementitious calcium ion source and non-cementitious high-alumina refractory aluminosilicate pozzolan to set comprises exposing the binder composition to temperatures in excess of 100° F.

18. The method of claim 10 wherein allowing the binder composition to set comprises allowing the binder composition to set at a temperature of about 200° F. or lower.

19. The method of claim 10 further comprising mixing one or more of the non-cementitious calcium ion source, and the non-cementitious high-alumina refractory aluminosilicate pozzolan with the water using mixing equipment.

20. The method of claim 10 wherein the binder composition is introduced into a subterranean formation using one or more pumps.

* * * * *